United States Patent
Morris et al.

(10) Patent No.: US 10,347,963 B2
(45) Date of Patent: Jul. 9, 2019

(54) EMBEDDING OF PROCESSOR INTO INTERNAL WIRELESS COUPLER OF A THROUGH GLASS ANTENNA

(71) Applicant: Danlaw, Inc., Novi, MI (US)

(72) Inventors: Tim Morris, Plymouth, MI (US); Scott Morell, Milford, MI (US); Craig Matthews, Highland, MI (US); Krishna Bandi, Farmington Hills, MI (US)

(73) Assignee: Danlaw, Inc., Novi, MI (US)

( * ) Notice: Subject to any disclaimer, the term of this patent is extended or adjusted under 35 U.S.C. 154(b) by 0 days.

(21) Appl. No.: 15/847,095

(22) Filed: Dec. 19, 2017

(65) Prior Publication Data

US 2018/0175478 A1 Jun. 21, 2018

Related U.S. Application Data

(60) Provisional application No. 62/436,999, filed on Dec. 20, 2016.

(51) Int. Cl.

| H01Q 1/12 | (2006.01) |
|---|---|
| H01Q 1/22 | (2006.01) |
| H04L 29/08 | (2006.01) |
| G08C 17/02 | (2006.01) |
| H04B 7/15 | (2006.01) |
| H04B 1/3822 | (2015.01) |
| H04L 29/06 | (2006.01) |

(52) U.S. Cl.
CPC ........... *H01Q 1/1271* (2013.01); *G08C 17/02* (2013.01); *H01Q 1/1285* (2013.01); *H01Q 1/2291* (2013.01); *H04B 7/15* (2013.01); *H04L 67/12* (2013.01); *H04B 1/3822* (2013.01); *H04L 69/08* (2013.01)

(58) Field of Classification Search
CPC ... H01Q 1/1271; H01Q 1/2291; H04B 1/3822
See application file for complete search history.

(56) References Cited

U.S. PATENT DOCUMENTS

| 6,337,622 B1 | 1/2002 | Sugano |
| 6,753,773 B2 | 6/2004 | Mizuno |
| 2004/0203390 A1 | 10/2004 | Inoue |
| 2004/0266344 A1* | 12/2004 | Zafar ...................... H01Q 1/08 455/13.3 |
| 2011/0140975 A1 | 6/2011 | Shigetomi |

FOREIGN PATENT DOCUMENTS

| CN | 102087786 A | 6/2008 |
| CN | 205281612 U | 6/2016 |
| JP | 2004-128940 A | 4/2004 |
| JP | 2004-320214 A | 11/2004 |

\* cited by examiner

*Primary Examiner* — Ayodeji O Ayotunde
(74) *Attorney, Agent, or Firm* — Brinks Gilson & Lione

(57) ABSTRACT

A system for vehicle communications is provided. The system may include a processor, a first wireless coupler, and a housing. The processor generates and receives communication messages external to the vehicle. The first wireless coupler being in communication with the processor to transmit the communication messages through a windshield. The housing surrounding and enclosing the processor and the first wireless coupler. The first wireless coupler being aligned with and communicating through the windshield with a second wireless coupler to transmit the communication messages through an integrated or externally connected antenna.

20 Claims, 5 Drawing Sheets

EMBEDDING OF PROCESSOR INTO INTERNAL WIRELESS COUPLER OF A THROUGH GLASS ANTENNA

CROSS REFERENCE TO RELATED APPLICATIONS

This application claims the benefit of U.S. Provisional Patent Application No. 62/436,999 filed Dec. 20, 2016, the content of which is hereby incorporated by reference in its entirety.

FIELD

The present disclosure relates to vehicle communication system that communicates a signal through a vehicle window.

BACKGROUND

The statements in this section merely provide background information related to the present disclosure and may not constitute prior art.

For the best system performance, current state-of-the-art dedicated short range communication (DSRC) systems use a roof mounted antenna and achieve excellent communication robustness. However, a roof mounted antenna would require drilling holes to make the connections for the existing aftermarket vehicles. Some solutions may use antennas mounted internally within the vehicle, for example to the window. However, internal antenna performance is limited and decreased because of the vehicle's pillars and roof interference.

SUMMARY

Drilling holes to route cables from outside to inside the vehicle to the DSRC electronic control unit (ECU) may be undesirable due to sealing, aesthetics and cable losses. Through the glass coupling can provide access to an external mounted antenna. The antenna design for through the glass coupling may use a stub/monopole antenna type for DSRC frequencies designed to mount on the exterior front/rear/side windshields.

A though glass antenna design is beneficial for promoting Vehicle to Everything (V2X) communications especially for aftermarket vehicles without drilling holes in vehicles and without increasing cable losses. The glass antenna system may include an internal and external coupler on opposite sides of the windshield. The internal and external couplers may be aligned with one another and used to transmit radio frequency (RF) signals though the windshield. The couplers may be placed on front, rear, or side windows. The coupler assembly may have design elements such as circuit board, dielectric substrate, base, insulator, foam, amplifier, filter etc. The internal and external wireless coupler assemblies may include a connector to which a transmission medium (e.g. coaxial cable) may be connected to carry electromagnetic signals between coupler and the antenna.

BRIEF DESCRIPTION OF THE DRAWINGS

Further details of the disclosure are described in more detail with reference to the drawings, in which.

DETAILED DESCRIPTION

Figure 1:
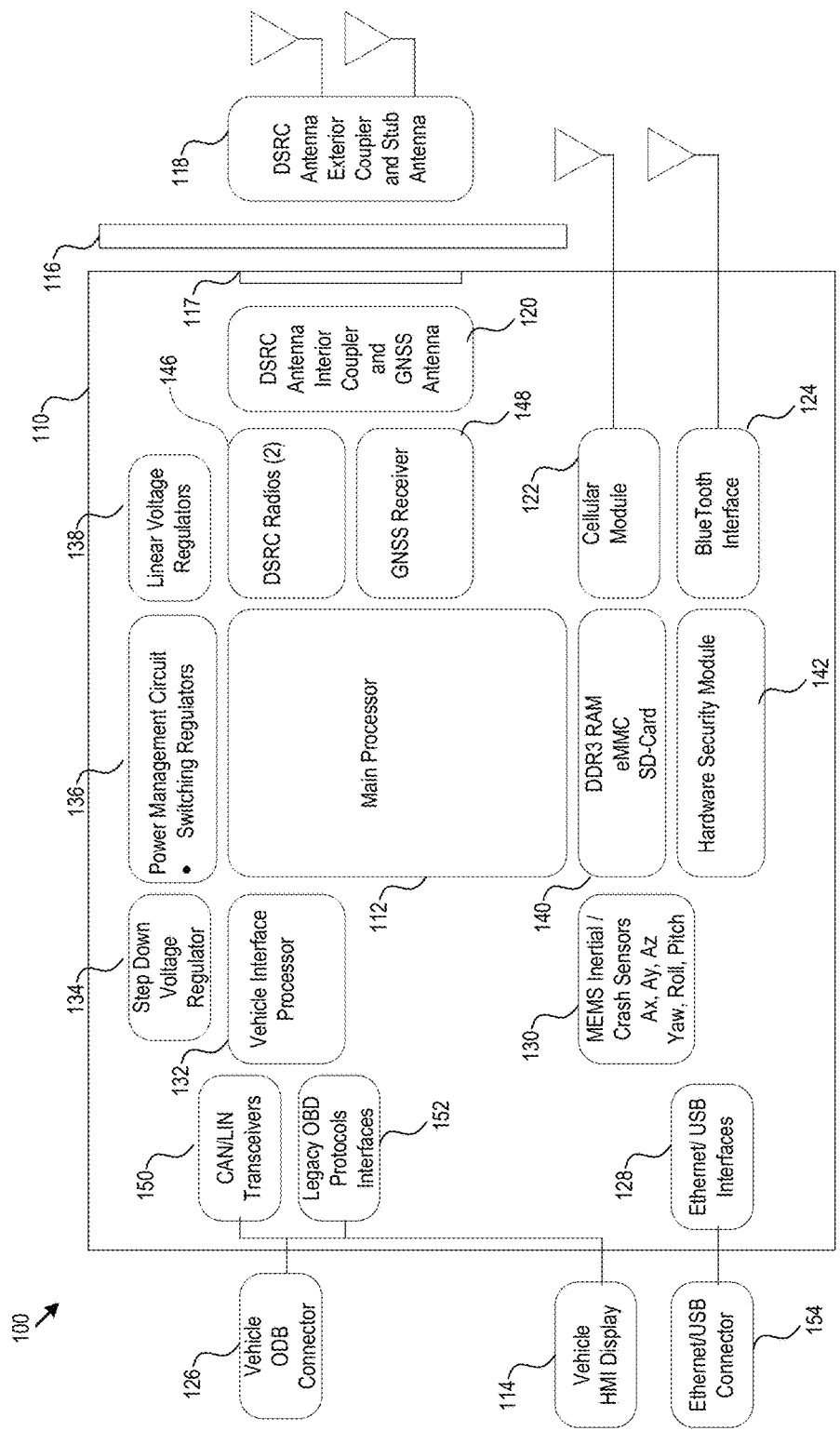
FIG. 1 is a block diagram of a coupler assembly with an integrated processor.

A vehicle communication system may utilize a window mounted unit that integrates a DSRC V2X ECU with a through glass antenna unit. The through glass antenna unit may include an internal wireless coupler and an external wireless coupler attached to an external stub antenna. The internal window mounted housing may integrate a DSRC V2X ECU and the internal wireless coupler into a single housing unit. Integrating the DSRC V2X ECU and the internal wireless coupler into a single housing unit decreases the RF cable loss which in turn improves the RF performance. The interior window mounted unit may include a DSRC V2X ECU, 2×DSRC radio channels, a global navigation satellite system (GNSS) receiver, 9 DoF Inertial Sensor (3× acceleration, 3× gyro, 3× magnetometer, 3 DoF Crash Sensors, a Cellular modem, a Hardware Security Processor, LIN/Low Energy Bluetooth HMI Interfaces, OBD vehicle interface (CAN, ISO9141, J1850, . . . ), Ethernet/USB interfaces, LIN Interface to an HMI Module, 9 LED Visual, Tone Audio Outputs, and a GNSS antenna. The external wireless coupler may include an integrated Dual or Single 5.9 GHz stub antenna or connected to a Dual or Single 5.9 GHz Aftermarket Installable Antenna (e.g. a stub antenna), These features discussed above may enable a number of applications including vehicle to vehicle (V2V) Safety Applications such as Forward Collision Warning, Emergency Electronic Brake Light, Intersection Movement Assist, Left Turn Assist, Blind Spot Warning/Lane Change Warning, and Control Loss Warning. Further, the features may also enable vehicle to infrastructure (V2I) applications such as Speed Compliance Warning, Curve Speed Warning, Speed in Work Zone Warning, Red Light Violation Warning, Oversize Vehicle Compliance, Emergency Communications & Evacuation Information, Pedestrian in Intersection warning, Vehicle Turning Right in front of Bus Warning, Icy Road Warning, and Vulnerable Road User Warning. The sensors and OBD connection are available to support Telematics applications such as User Based Insurance, Fleet Management, and Road Usage Charging applications. The connectivity options may also allow Secure Over-the-air update and Flexible Vehicle Event Data Recording and Reporting.

Also, integrating a DSRC V2X radio into the internal wireless coupler unit provides reduced cabling, power, and cost. The DSRC V2X system with internal wireless coupler connects with the external wireless coupler and links with an omni directional antenna. The DSRC V2X system integration with the internal wireless coupler may be placed anywhere on the inside of the vehicle windshield (front/rear/side). Further regardless of system placement on the windshield (front/rear/side), system calibration may be done with respect to the vehicle reference. The system calibration can be very important for the V2X communication, to correct the vehicle position to the geometric center, rather than the location of the GNSS antenna.

The messages received by the internal wireless coupler from the external wireless coupler or generated by the internal wireless coupler may be communicated with a vehicle infotainment system (e.g. via a wireless communication medium such as bluetooth). The integrated system can be powered via the vehicle's OBD port or through a wired power cable. In some implementations, the integrated system can be powered via cigarette lighter. In other implementations; the system may utilize wireless power transmitter in cigarette lighter which is received in the housing. The wireless transmission of power can be done through any ISM band (Bluetooth or Wi-fi or any non-allocated frequency band).

FIG. 1 is a block diagram of a window mounted vehicle communication system. The system 100 includes a housing 110 configured to surround and protect system components including a processor 112. The housing 110 may be configured to mount to the inside of a windshield. (e.g. front, rear, or side windshield) The housing may mount to the window. In some implementations, the housing may attach to the window but extend over the roof line (e.g. maybe bent). The housing may be attached to the window by an adhesive.

Further, the processor communicates with devices external to the vehicle via a wireless through glass coupling. The wireless through glass coupling may be of the type described in U.S. patent application Ser. No. 15/299,102 entitled THROUGH GLASS ANTENNA and filed on Oct. 20, 2016 which in hereby incorporated by reference.

The wireless through glass coupling may include a first wireless coupler 120 located within the housing 110. The first wireless coupling 120 is oriented within the housing 110 to face the windshield 116. Further, the first wireless coupling 120 is aligned with a second wireless coupler 118 on an opposite side of the glass windshield (e.g. outside the vehicle). The alignment of the first wireless coupling 120 and the second wireless coupler 118 may be such that the area of the first wireless coupling 120 substantially overlaps with the area of the second wireless coupling 118 when projected into a plane parallel with the vehicle windshield 116. Further, the housing 110 may have an opening 117 (e.g. a window) aligned with the first wireless coupler 120 and second wireless coupler 118. The opening 117 may be substantially the same size and shape as the first wireless coupling 120 or the opening 117 may cover the entire side of the housing 110 against the window. In some examples, the housing 110 may be formed from a metal material. The housing 110 may be formed of a conductive material so as to create a Faraday cage and shield electronics within the housing from electrical noise. In other examples, the housing 110 may be formed of non-conductive material such as plastic.

The processor 112 may communicate with the first wireless coupler 120 through various communication protocols. For example, a system may include a DSRC radio controller 146 configured to generate signals in the DSRC protocol. Further, the system may include a GNSS receiver unit 148. The GNSS receiver unit may be configured to translate messages to and from the GNSS protocol for the main processor 112. The wireless through glass coupling may be configured to communicate both the DSRC signals and GNSS signals through the first wireless coupler 120 and the second wireless coupler 118. In some implementations, multiple pairs of first wireless couplers 120 and second wireless couplers 118 may be used, where each pair of first and second wireless couplers is used for a different signal type (e.g. GNSS or DSRC). Each pair of first and second wireless couplers may be designed for the particular frequency ranges related to the different signal type allocated to that pair. DSRC may be used as communication for safety applications. The processor may send BSM (Basic Safety Message) format communications. Such messages may include, physical location, acceleration/deceleration rate, direction of vehicles.

The system may also include a 3G or 4G cellular module 122 located within the housing 110. The processor 112 may communicate to remote systems through the cellular module. The antennas for the cellular module 122 may be located within the housing. Windows in the housing 110 may align with the antenna for the cellular module 122. Information communicated through the cellular module may be to update software or settings on the processor 112. In some implementations, data collected from the internal sensors, a GPS module or collected from the vehicle (e.g. through the ODB port) can be communicated with a remote system through the cellular module 122.

The processor 112 communicates with an HMI unit 114 to provide information to a driver and receive information from a driver and/or user of the vehicle. The system may include a vehicle interface processor 132. The vehicle interface processor 132 may control communications between the main processor 112 and external units for example, communicate over a CAN communication bus interface 150, over an ODB port interface 152, or other various communication protocols. For example, the vehicle interface processor may communicate with the vehicle via an ODB connector 126 or via a vehicle HMI display 114, for example over a CAN or LIN bus.

The vehicle interface bus 132 may also communicate with Ethernet, USB interfaces 128 which may provide Ethernet or USB connector 154 through the housing of the system 110. The Ethernet, Wifi, or USB may be used to download software updates, configuration updates, or data updates (e.g. Maps). Further, the USB port may be used to connect Wifi, Ethernet or Bluetooth dongles (e.g. that contain Wifi, Bluetooth, or Ethernet hardware that connect to the processor through the USB port. The Ethernet port may also be used for testing and diagnostics of the system.

In some implementations, a CAN bus may be connected between the window mounted housing 110 and an external HMI unit or OBD pluggable unit. In this scenario, a cable may be connected between the housing 110 and HMI or ODB unit. In such an implementation the cable may include a CAN HIGH connection and a CAN LOW connection. The cable may also include a power HIGH connection and power LOW connection. In other implementations, a wireless connection may be used to communicate with the HMI or ODB unit. In such a scenario power may be provided to the window mounted housing 110 in various ways. In one example, a battery may be used to power the electronics within the housing 110. The battery may be charged via a power connection to a utility outlet in the vehicle (e.g. a cigarette lighter plug). The battery may be charged by a solar panel integrated within or connected to the housing 110. In other implementations, the electronics may be directly powered by the utility outlet connection or solar panel.

The system may also include a Bluetooth interface 124 within the housing 110. The Bluetooth module may be used to connect to an HMI, for example, the Bluetooth may be used to connect to an app on a vehicle entertainment system. In other implementations, the Bluetooth may be used to connect to an app on a phone or tablet of a driver or a user within the vehicle. Apps may include display of information related to safety, forward collision warning, hard braking, collision detection, construction warnings, oversized vehicle warnings, overpass warnings, lane change warnings, and red light violation warnings. The processor 112 may be in communication with a memory 140. The memory may include random access memory, electronic programmable memory, solid state memory, or even removable memory such as SD cards. The processor may also be in communication with a security processor 142 for encoding data that is transmitted to or from the processor.

The processor 112 may be in communication with a sensor unit 130 to collect and process information about the vehicle movement, location, position, and orientation. The sensor unit 130 may include MEMS inertial and/or crash sensors. As such, the sensor unit 130 may determine information such as acceleration in the x, y or z axis of the vehicle as well as yaw, roll, and pitch of the vehicle. The sensor unit 130 may include a global positioning system (GPS) for communicating with satellites to triangulate the position of the vehicle over time.

Since the system is located remotely on the windshield of the vehicle, power management may be an important aspect of the system control. The processor and other protocols may be powered through a power management circuit 136. The power management circuit 136 may communicate with a step down voltage regulator 134 to adjust power provided from the vehicle to power the processors and peripherals. In a similar manner, the power management circuit 136 may be in communication with linear voltage regulators 138 for controlling power to the main processor and peripheral devices as appropriate. In some implementations, the power management circuit 136 is configured to enter a power saving mode (e.g. shut down certain modules such as sensors, communications or processors, enter low power mode for certain modules such as sensors, communications, or processors, or reduce clock speeds) in response to inertial sensing, based on communication from wireless coupler, and/or based on communication from the processor.

The electronics within the housing 110 may be in the form of a stack of printed circuit boards (PCB). In one implementation, the first wireless coupler 120 may be mounted on an outward facing first surface of an outer PCB of the PCB stack. Further, other wireless devices such as the Wifi or Bluetooth antenna may be on an opposite side of the PCB stack, on the other outer PCB of the PCB stack, (e.g. on the outer surface facing inward into the vehicle interior). Further, the PCB stack may be fastened to the housing on the same surface that is attached to (e.g. in contact) with the windshield.

Locating the processor and sensors in the windshield mounted housing may provide various advantages. For example, in a centrally located processor (e.g. located under the hood) two RF cables would be routed to the windshield mounted unit. In a typical scenario, for every one meter of cable=1 dB of signal is lost. As such, there is both performance and cost benefits to incorporating the processor and sensing units into the windshield mounted housing.

Various implementations have been specifically described. However, many other implementations are also possible. The first and second wireless couplers may be implemented using patch or slot antennas. Various slot configurations may be used. Additional configurations provided on the attached sheets and drawings may be used separately or combined with each other or aspects described in the paragraphs above. Accordingly, the wireless through window coupling may take the form described in any of the implementations described in U.S. patent application Ser. No. 15/299,102 entitled "Through Glass Antenna" and filed Oct. 20, 2016 which is incorporated by reference.

The system may be used for radio frequency transmission of a radio frequency signals through a window of a vehicle. The window may be made of glass, polycarbonate, or other material. The system may include a transceiver. The transceiver may be configured to generate a radio frequency signal between the range of 5.70 and 5.95 GHz. The signal may be for a variety of applications including Vehicle to Vehicle (V2V), Vehicle to Infrastructure (V2I), Vehicle to Pedestrian (V2P), Vehicle to Cloud (V2C) or in simple for Vehicle to Everything (V2X) communication, for example for safety applications.

Figure 2:
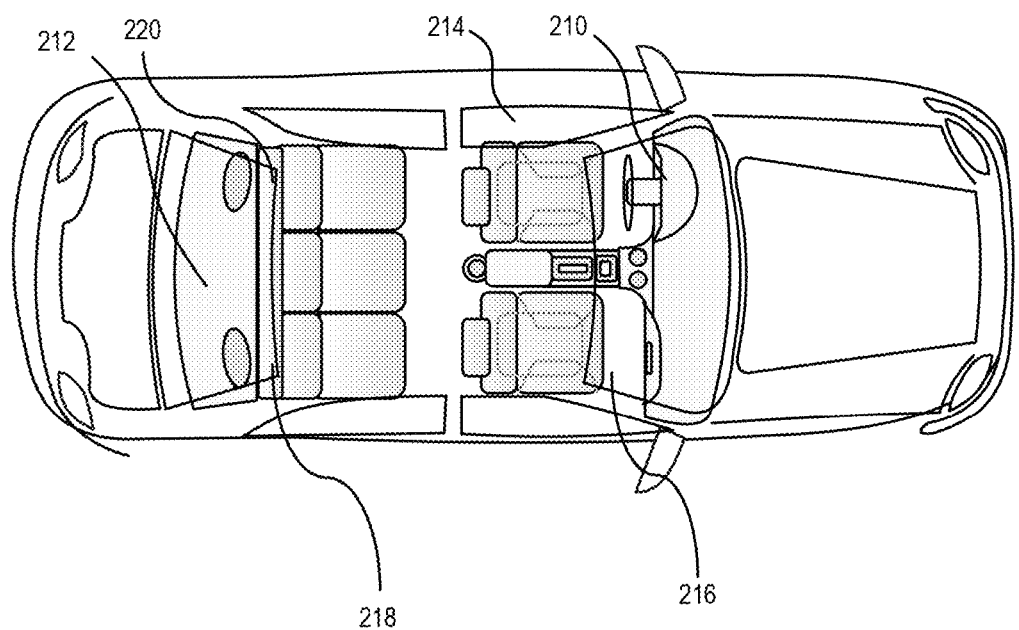
FIG. 2 is a top view of a vehicle illustrating antenna placement for a vehicle communication system.
Figure 3:
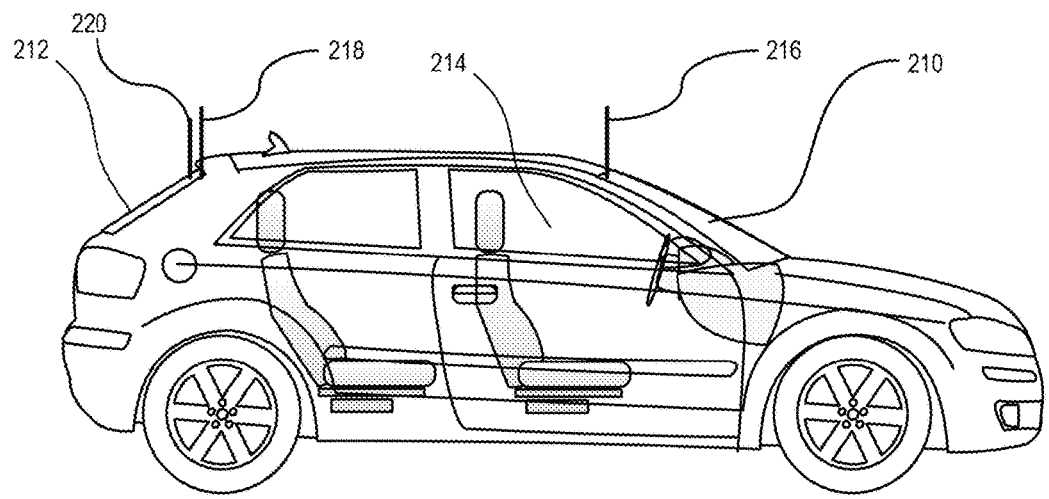
FIG. 3 is a side view of the vehicle from FIG. 1 illustrating antenna placement for the vehicle communication system.

FIG. 2 is a top view of a vehicle illustrating antenna placement for a vehicle communication system. The antennas may be placed on the front windshield 210 or on the rear windshield 212. The antennas may use through the glass coupling, as described elsewhere in this application. FIG. 3 is a side view of the vehicle from FIG. 2 illustrating antenna placement for the vehicle communication system. In some implementations, antennas may be placed on a side window 214, using through glass coupling through the side window. In one implementation, an antenna 216 may be located along the center of the vehicle, for example on the front windshield. In some implementations, an antenna 218 may be located on the left side of the vehicle, while an antenna 220 may be located on the right side of the vehicle. For example, antennas 218 and 220 may be located on the rear windshield.

Figure 4:
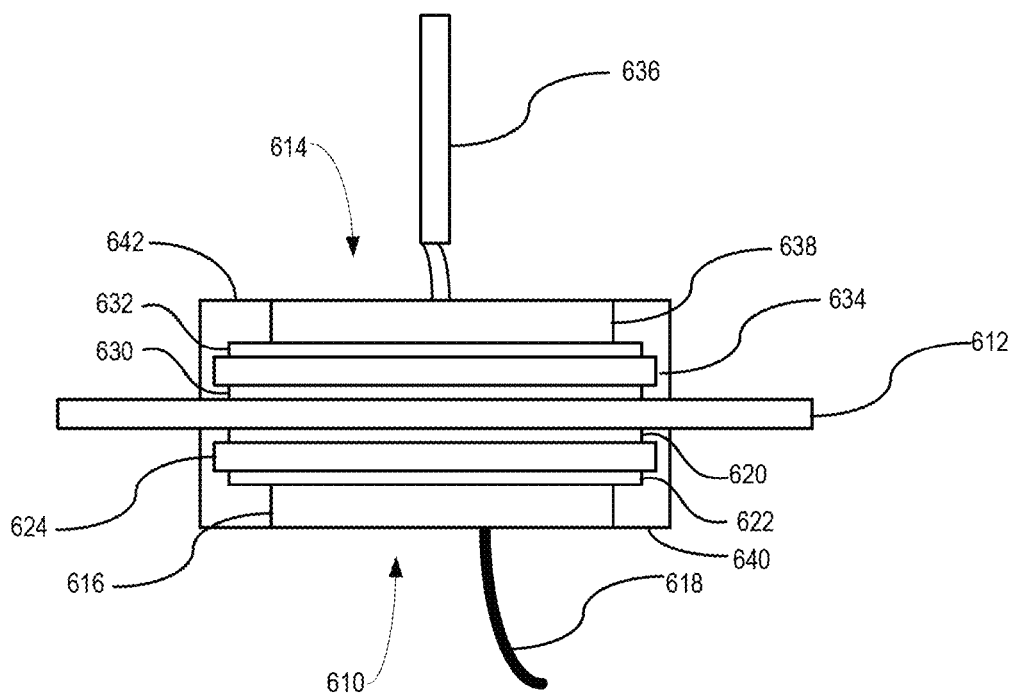
FIG. 4 is a block diagram of vehicle communication system using a though glass coupler.

FIG. 4 is a block diagram of a vehicle communication system using a through glass coupler. The system may include a first wireless coupler 610 and a second wireless coupler 614. The first wireless coupler 610 may be attached to a first side of a window 612 and may be configured to receive the radio frequency signal from integrated electronics 616. The integrated electronic 616 may, for example, be part of a processor for vehicle to everything communications. The integrated electronics 616 may communicate with other components through a cable 618. In some implementations, the integrated electronics 616 may be contained and protected within a housing 640 the first wireless coupler 610. The first wireless coupler 610 may include a first conductive plate 620, a second conductive plate 622, and a dielectric layer 624 in a sandwich structure. The conductive plates 620, 622 may be made of copper or other various conductive materials. The dielectric layer 624 may isolate the first conductive plate 620 from the second conductive plate 622. The dielectric layer 624 may be made from various non-conductive materials such as FR4 or Rojer Taconic TLC, etc. The characteristics of the first conductive plate 620, the second conductive plate 622, and the dielectric layer 624 of the first wireless coupler 610 may be configured to resonate at a frequency between the range of 5.70 and 5.95 GHz. The surface area of the first conductive plate 620 may be smaller than the surface area of the second conductive plate 622. The first conductive plate 620 may be closer to the window 612 than the second conductive plate 622 and the first conductive plate 620 may act as a transmission plate while the second conductive plate 622 may be a ground plate.

The system may also include a second wireless coupler 614 attached to a second side of the window 612. The second wireless coupler 614 may be aligned with the first wireless coupler 610. For example, the first conductive plate 630 of the second wireless coupler 614 may be substantially parallel with the first conductive plate 620 of the first wireless coupler 610. Further, the outline of the first conductive plate 630 of the second wireless coupler 614 projected perpendicular to the surface of the first conductive plate 630 would substantially overlap with the outline of the first conductive plate 620 of the first wireless coupler 610. The first wireless coupler 610 being configured to transmit the radio frequency signal from the first wireless coupler 610 to the second wireless coupler 614 through the window 612. The second wireless coupler 614 may include the first conductive plate 630, a second conductive plate 632, and a dielectric layer 634 in a sandwich structure. The conductive plates 630, 632 may be made copper or other various conductive materials. The dielectric layer 634 may isolate the first conductive plate 630 from the second conductive plate 632. The first conductive plate 630 may be smaller in width or length than the dielectric layer 634. Further, the surface area of first conductive plate 630 may be smaller than the surface area of the dielectric layer 634. The dielectric layer 634 may be made from various non-conductive materials such as FR4 or Rojer Taconic TLC, etc. The characteristics of the first conductive plate 630, the second conductive plate 632, and the dielectric layer 634 of the second wireless coupler 614 may be configured to resonate at a frequency between the range of 5.70 and 5.95 GHz, and more specifically in some applications 5.850 and 5.925 GHz, and yet in some applications 5.725 and 5.850 GHz. Further, the characteristics of the second wireless coupler 614 may be the same as the first wireless coupler 610. The first conductive plate 630 may be smaller in width or length than the second conductive plate 632. Further, the surface area of first conductive plate 630 may be smaller than the surface area of the second conductive plate 632. The first conductive plate 630 may be closer to the window 612 than the second conductive plate 632 and the first conductive plate 630 may act as a transmission plate while the second conductive plate 632 may be a ground plate.

An antenna 636, such as a whip antenna or stub antenna or monopole antenna, may be electrically connected to the second wireless coupler 614 and configured to transmit and/or receive the radio frequency signal outside the vehicle. The antenna 636 may be configured to extend from the second wireless coupler 614 to above the roof line of the vehicle. The antenna 636 may be configured to transmit at a frequency between the range of 5.70 and 5.95 GHz, and more specifically in some applications 5.850 and 5.925 GHz, and yet in some applications 5.725 and 5.850 GHz.

The system may include an amplifier 638, for example housed within a housing 642 of the second wireless coupler 614. The amplifier 638 may be configured to amplify the radio frequency signal. The amplifier 638 may be positioned electrically between the second wireless coupler 614 and the antenna 636. The second wireless coupler 614 may inductively receive power from the first wireless coupler 610 to power the amplifier circuit 638. The antenna 636 or the amplifier circuit 638 may be directly connected to the second wireless coupler 614 or connect via a cable.

In some implementations, the system may include an inductive coupling to provide power to the amplifier 638. The second wireless coupler may include a coil to wirelessly receive power from a coil in the first wireless coupler. Further, the second coupler may include one or more switches to disable or bypass the amplifier circuit. The switches may be activated based on the supply of power from the first wireless coupler or a control signal which may be provide via various means including electrical, magnet, or optical signals. The amplifier may be switched on or off based on various factors, for example, expected distance of transmission, weather conditions, vehicle speed, which may be measured using various sensors for distance, weather, or speed. Expected distance of transmission may, in one example, be determined by received signal strength for example.

Figure 5:
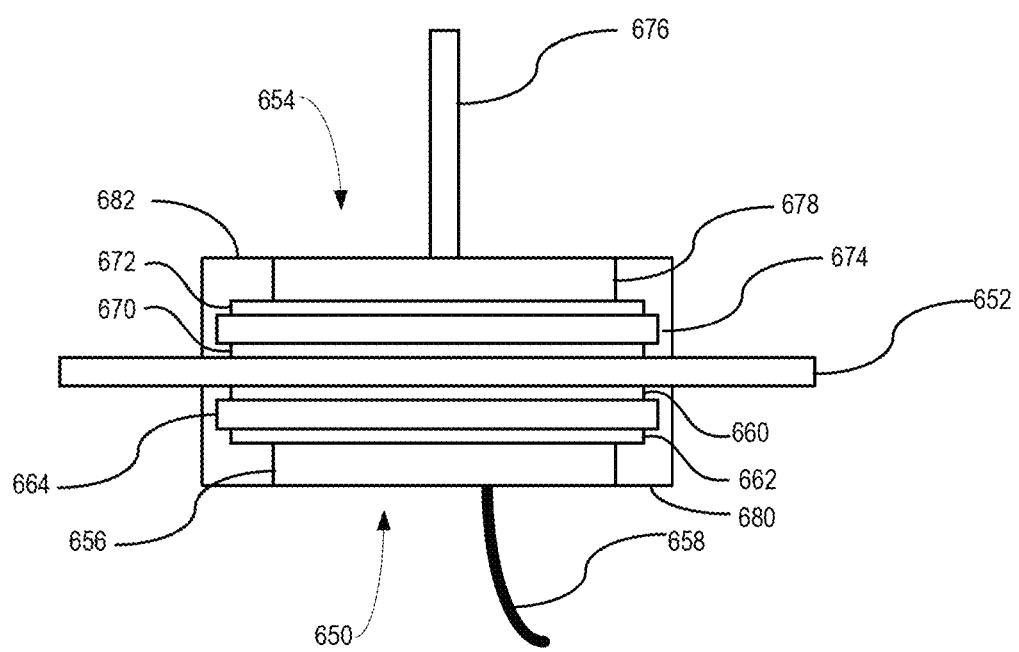
FIG. 5 is a block diagram of another vehicle communication system using a though glass coupler.

FIG. 5 is a block diagram of a vehicle communication system using a through glass coupler. The system may include a first wireless coupler 650 and a second wireless coupler 654. The first wireless coupler 650 may be attached to a first side of a window 652 and may be configured to receive the radio frequency signal from integrated electronics 656. The integrated electronics 656 may, for example, be part of a processor for vehicle to everything communications. The integrated electronics 656 may be contained within a housing 680 and provide the radio frequency signal for the first wireless coupler 650. The integrated electronics 656 may communicate with other components through a cable 658. The first wireless coupler 650 may include a first conductive plate 660, a second conductive plate 662, and a dielectric layer 664 in a sandwich structure. The conductive plates 660, 662 may be made of copper or other various conductive materials. The dielectric layer 664 may isolate the first conductive plate 660 from the second conductive plate 662. The dielectric layer 664 may be made from various non-conductive materials such as FR4 or Rojer Taconic TLC, etc. The characteristics of the first conductive plate 660, the second conductive plate 662, and the dielectric layer 664 of the first wireless coupler 650 may be configured to resonate at a frequency between the range of 5.70 and 5.95 GHz. The surface area of the first conductive plate 660 may be smaller than the surface area of the second conductive plate 662. The first conductive plate 660 may be closer to the window 652 than the second conductive plate 662 and the first conductive plate 660 may act as a transmission plate while the second conductive plate 662 may be a ground plate.

The system may also include a second wireless coupler 654 attached to a second side of the window 652. The second wireless coupler 654 may be aligned with the first wireless coupler 650. For example, the first conductive plate 670 of the second wireless coupler 654 may be substantially parallel with the first conductive plate 660 of the first wireless coupler 650. Further, the outline of the first conductive plate 670 of the second wireless coupler 654 projected perpendicular to the surface of the first conductive plate 670 would substantially overlap with the outline of the first conductive plate 660 of the first wireless coupler 650. The first wireless coupler 650 being configured to transmit the radio frequency signal from the first wireless coupler 650 to the second wireless coupler 654 through the window 652. The second wireless coupler 654 may include the first conductive plate 670, a second conductive plate 672, and a dielectric layer 674 in a sandwich structure. The conductive plates 670, 672 may be made copper or other various conductive materials. The dielectric layer 674 may isolate the first conductive plate 670 from the second conductive plate 672. The first conductive plate 670 may be smaller in width or length than the dielectric layer 674. Further, the surface area of first conductive plate 670 may be smaller than the surface area of the dielectric layer 674. The dielectric layer 674 may be made from various non-conductive materials such as FR4 or Rojer Taconic TLC, etc. The characteristics of the first conductive plate 670, the second conductive plate 672, and the dielectric layer 674 of the second wireless coupler 654 may be configured to resonate at a frequency between the range of 5.70 and 5.95 GHz, and more specifically in some applications 5.850 and 5.925 GHz, and yet in some applications 5.725 and 5.850 GHz. Further, the characteristics of the second wireless coupler 654 may be the same as the first wireless coupler 650. The first conductive plate 670 may be smaller in width or length than the second conductive plate 672. Further, the surface area of first conductive plate 670 may be smaller than the surface area of the second conductive plate 672. The first conductive plate 670 may be closer to the window 652 than the second conductive plate 672 and the first conductive plate 670 may act as a transmission plate while the second conductive plate 672 may be a ground plate.

An antenna 676, such as a whip antenna or stub antenna or monopole antenna, may be electrically connected to the second wireless coupler 654 and configured to transmit and/or receive the radio frequency signal outside the vehicle. The antenna 676 may be configured to extend from the second wireless coupler 654 to above the roof line of the vehicle. The antenna 676 may be configured to transmit at a frequency between the range of 5.70 and 5.95 GHz, and more specifically in some applications 5.850 and 5.925 GHz, and yet in some applications 5.725 and 5.850 GHz.

The system may include an amplifier 678 which may be located in a housing 682 of the second wireless coupler 654 configured to amplify the radio frequency signal. The amplifier 678 may be positioned electrically between the second wireless coupler 654 and the antenna 676. The second wireless coupler 654 may inductively receive power from the first wireless coupler 650 to power the amplifier circuit 678. The antenna 676 or the amplifier circuit 638 may be directly connected to the second wireless coupler 654.

In some implementations, the system may include an inductive coupling to provide power to the amplifier 678. The second wireless coupler may include a coil to wirelessly receive power from a coil in the first wireless coupler. Further, the second coupler may include one or more switches to disable or bypass the amplifier circuit. The switches may be activated based on the supply of power from the first wireless coupler or a control signal which may be provide via various means including electrical, magnet, or optical signals. The amplifier may be switched on or off based on various factors, for example, expected distance of transmission, weather conditions, vehicle speed, which may be measured using various sensors for distance, weather, or speed. Expected distance of transmission may, in one example, be determined by received signal strength for example.

The methods, devices, processors, modules, engines, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible. The first and second wireless couplers may be implemented using patch or slot antennas. Various slot configurations may be used. Additional configurations provided on the attached sheets and drawings may be used separately or combined with each other or aspects described in the paragraphs above.

The invention claimed is:

1. A system for vehicle communications; the system comprising:
   a processor for generating and receiving communication messages external to the vehicle, the processor is configured to generate communication messages within the frequency range of 5.70 and 5.95 GHz;
   a first wireless coupler in communication with the processor to transmit the communication messages through a windshield;
   a housing surrounding and enclosing the processor and the first wireless coupler, comprising inertial sensors located within the housing for measuring acceleration of the vehicle and communicating the acceleration from the first wireless coupler inside the vehicle window to the second wireless coupler outside the wireless coupler.

2. The system of claim 1, wherein the housing is configured to mount to the windshield.

3. The system of claim 1, wherein the first wireless coupler is aligned with a second wireless coupler.

4. The system of claim 1, wherein the housing includes an opening aligned with the first wireless coupler.

5. The system of claim 1, wherein the second wireless coupler is in communication with an antenna.

6. The system of claim 1, wherein the housing is a conductive metal housing.

7. The system of claim 1, wherein the processor is configured to communicate messages from the wireless coupler to a wireless connection with a vehicle infotainment system.

8. A system for vehicle communications; the system comprising:
   a processor for generating and receiving communication messages external to the vehicle;

a first wireless coupler in communication with the processor to transmit the communication messages through a windshield;
a housing surrounding and enclosing the processor and the first wireless coupler;
wherein the wireless connection with the vehicle infotainment system is over a bluetooth connection.

9. A system for vehicle communications; the system comprising:
a processor for generating and receiving communication messages external to the vehicle;
a first wireless coupler in communication with the processor to transmit the communication messages through a windshield;
a housing surrounding and enclosing the processor and the first wireless coupler;
wherein the processor is configured to generate DSRC communication messages.

10. A system for vehicle communications; the system comprising:
a processor for generating and receiving communication messages external to the vehicle;
a first wireless coupler in communication with the processor to transmit the communication messages through a windshield;
a housing surrounding and enclosing the processor and the first wireless coupler;
wherein the processor is configured to generate communication messages according to a BSM protocol.

11. A system for vehicle communications; the system comprising:
a processor for generating and receiving communication messages external to the vehicle;
a first wireless coupler in communication with the processor to transmit the communication messages through a windshield;
a housing surrounding and enclosing the processor and the first wireless coupler;
inertial sensors located within the housing for measuring acceleration of the vehicle and communicating the acceleration from the first wireless coupler inside the vehicle window to the second wireless coupler outside the wireless coupler.

12. A system for vehicle communications; the system comprising:
a processor for generating and receiving communication messages external to the vehicle;
a first wireless coupler in communication with the processor to transmit the communication messages through a windshield;
a housing surrounding and enclosing the processor and the first wireless coupler;
a battery located within the housing for providing power to the processor.

13. A system for vehicle communications; the system comprising:
a processor for generating and receiving communication messages external to the vehicle;
a first wireless coupler in communication with the processor to transmit the communication messages through a windshield;
a housing surrounding and enclosing the processor and the first wireless coupler;
a cable connection extending through the housing, the cable connection being attached to a cigarette lighter power cord.

14. A system for vehicle communications; the system comprising:
a processor for generating and receiving communication messages external to the vehicle;
a first wireless coupler in communication with the processor to transmit the communication messages through a windshield;
a housing surrounding and enclosing the processor and the first wireless coupler;
a cable connection extending through the enclosure, the cable connection including a CAN High connection and a CAN Low connection in communication with vehicle HMI display.

15. A system for vehicle communications; the system comprising:
a processor for generating and receiving communication messages external to the vehicle;
a first wireless coupler in communication with the processor to transmit the communication messages through a windshield;
a housing surrounding and enclosing the processor and the first wireless coupler;
a power management circuit controlling power to the processor.

16. The system of claim 15, wherein the power management circuit is configured to enter a power saving mode in response to inertial sensing.

17. The system of claim 15, wherein the power management circuit is configured to enter a power saving mode based on communication from wireless coupler.

18. The system of claim 15, wherein the power management circuit is configured to enter a power saving mode based on communication from processor.

19. A system for vehicle communications; the system comprising:
a processor for generating and receiving communication messages external to the vehicle;
a first wireless coupler in communication with the processor to transmit the communication messages through a windshield;
a housing surrounding and enclosing the processor and the first wireless coupler;
wherein the processor is configured to wirelessly communicate with a remote unit connected to a vehicle OBD port.

20. A system for vehicle communications; the system comprising:
a processor for generating and receiving communication messages external to the vehicle;
a DSRC radio for V2X communications, the DSRC radio being in communication with the processor;
a first wireless coupler in communication with the DSRC radio to transmit the communication messages through a windshield;
inertial sensors in communication with the processor to provide acceleration measurements to the processor;
a housing surrounding and enclosing the processor and the first wireless coupler, the housing being configured to attach to a vehicle windshield, the first wireless coupler on an inside of the windshield being aligned with a second wireless coupler attached to an outside of the windshield, a window being formed in the housing aligned between the first wireless coupler and the second wireless coupler, wherein the acceleration measurements are communicated between the first wireless coupler and the second wireless coupler.

\* \* \* \* \*